United States Patent
Lutz et al.

(10) Patent No.: US 10,190,028 B2
(45) Date of Patent: Jan. 29, 2019

(54) EPOXY TWO-PART FORMULATIONS

(71) Applicant: Dow Global Technologies LLC, Midland, MI (US)

(72) Inventors: Andreas Lutz, Galgenen (CH); Benjamin Alexander Haag, Horgen (CH); Beda Steiner, Schaenis (CH)

(73) Assignee: Dow Global Technologies LLC, Midland, MI (US)

( * ) Notice: Subject to any disclaimer, the term of this patent is extended or adjusted under 35 U.S.C. 154(b) by 124 days.

(21) Appl. No.: 15/111,976

(22) PCT Filed: Mar. 24, 2015

(86) PCT No.: PCT/US2015/022142
§ 371 (c)(1),
(2) Date: Jul. 15, 2016

(87) PCT Pub. No.: WO2015/153182
PCT Pub. Date: Oct. 8, 2015

(65) Prior Publication Data
US 2018/0163100 A1 Jun. 14, 2018

Related U.S. Application Data

(60) Provisional application No. 61/973,884, filed on Apr. 2, 2014.

(51) Int. Cl.
*C08L 63/00* (2006.01)
*C09J 163/00* (2006.01)
*C08G 59/24* (2006.01)
*C09J 11/08* (2006.01)

(52) U.S. Cl.
CPC .......... *C09J 163/00* (2013.01); *C08G 59/245* (2013.01); *C08L 63/00* (2013.01); *C09J 11/08* (2013.01)

(58) Field of Classification Search
None
See application file for complete search history.

(56) References Cited

U.S. PATENT DOCUMENTS

| | | | |
|---|---|---|---|
| 8,088,245 B2 | 1/2012 | Lutz et al. | |
| 8,278,398 B2 | 10/2012 | Lutz et al. | |
| 8,491,749 B2 | 7/2013 | Gorodisher et al. | |
| 8,669,384 B2 | 3/2014 | Ripplinger et al. | |
| 9,212,251 B2 | 12/2015 | Frick et al. | |
| 2008/0251203 A1* | 10/2008 | Lutz ................ | C08G 18/10 156/330 |
| 2010/0009196 A1* | 1/2010 | Kramer ............. | C08G 18/10 428/413 |

FOREIGN PATENT DOCUMENTS

| | | |
|---|---|---|
| EP | 2402395 A2 | 1/2012 |
| GB | 854679 A | 11/1960 |
| WO | 2010011705 A1 | 1/2010 |
| WO | 2011146580 A2 | 11/2011 |
| WO | 2011163282 A2 | 12/2011 |
| WO | 2013043363 A2 | 3/2013 |

* cited by examiner

*Primary Examiner* — Ana L. Woodward

(57) ABSTRACT

The invention relates to resin compositions for epoxy adhesives, comprising a di-functional aromatic epoxy compound. The resin compositions and/or uncured adhesive compositions having low viscosity at low temperatures. Adhesives made therefrom have good strength and bulk properties. The invention includes methods of making and using the compositions, as well as adhesives made from the compositions.

2 Claims, No Drawings

EPOXY TWO-PART FORMULATIONS

FIELD OF THE INVENTION

The present invention relates to two-part epoxy adhesive compositions comprising a reactive aromatic epoxy compound, and to methods of making and using the compositions.

INTRODUCTION

Two-part (or 2K) structural epoxy adhesives are used for body repair in the automotive industry, for example, in automobile repair shops. Their mechanical performance offers high static and dynamic strength and as a result they restore the structural integrity of the originally adhesively bonded parts. The viscosities of such two-part adhesive formulations at low application temperatures below 20° C. are, however, so high that an application at these temperatures can be impossible without heating up the adhesive to higher temperatures.

Aliphatic diluents like 3,4-epoxycyclohexylmethyl-3,4-epoxycyclohexanecarboxylate (Syna Epoxy 21 supplied by Synasia) or Polypox R3 can help to lower viscosity of the resin composition. However, the amount of aliphatic diluents necessary to acceptably lower the viscosity causes an unacceptable drop in the glass transition temperature.

U.S. Pat. No. 8,491,749 (a family member of WO 2010/011705), describes toughening agents for use in two-part adhesive formulations. The patent states that too much toughening agent leads to increased viscosity and poor handling. The patent states it provides new toughening agents that can be used at lower addition levels.

U.S. Pat. No. 8,669,384 (the disclosure of which is incorporated herein by reference in its entirety), discloses methods of manufacturing divinylarene dioxides, and discloses that the compounds are useful in epoxy thermoset formulations, or in the production of various other products, such as coatings, composites, and molding compositions.

There remains a need for two-part epoxy adhesives that exhibit sufficiently low viscosity that they can be handled and processed below room temperature. There remains a need for such two-part epoxy adhesives that have acceptably high glass transition temperatures (Tg).

SUMMARY OF THE INVENTION

We have unexpectedly found that if an reactive aromatic epoxy compound, such as 1,4-divinylbenzene dioxide is included in the epoxy part A of a two-part formulation (the epoxy resin composition), the viscosity prior to curing, especially at low temperatures, is significantly decreased, while maintaining mechanical strength values and glass transition temperatures on a high level as required. This allows the adhesive to be applied to a surface or substrate at lower temperatures.

The present invention provides a resin composition A for a two-part adhesive comprising a) a di-functional aromatic epoxy compound (preferably 1,4-divinylbenzene dioxide); b) a polyphenolic blocked polyurethane; and c) a core shell rubber epoxy dispersion. The resin composition preferably has a viscosity of 200 Pa·sec or less at 15° C. When combined with a hardener composition B capable of curing the resin composition A, the mixture preferably has a viscosity of 100 Pa·sec or less at 15° C. The cured epoxy adhesive preferably has a Tg greater than 70° C.

DETAILED DESCRIPTION OF THE INVENTION

Resin compositions of the present invention comprise a di-functional aromatic epoxy compound, a polyphenolic blocked polyurethane, and a core-shell rubber epoxy dispersion. The resin compositions may also optionally comprise another epoxy resin, such as a liquid or solid epoxy resin.

The di-functional aromatic epoxy compound can be any divinylarene dioxide, that is, any aromatic compound having exactly two epoxy groups. It is believed that more than two epoxy groups would lead to excessive cross-linking. Such compounds can generally be described by formula I:

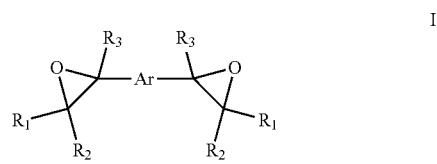

where Ar is an aromatic moiety which can be naphthyl, benzene, substituted benzenes, (optionally substituted) ring-annulated benzenes, or homologously bonded (optionally substituted) benzenes, or mixtures thereof. Each of $R_1$, $R_2$, and $R_3$, is independently hydrogen, alkyl, cycloalkyl, aryl or aralkyl group; or oxidant-resistant group including for example halogen, nitro, isocyanate, or RO group, wherein R may be an alkyl, aryl or aralkyl. Preferably, Ar is benzene, preferably phenyl (for example, o-, m-, or p-phenylene), and more preferably p-phenylene. The aromatic moiety can be unsubstituted, or can be substituted with one or more lower alkyl groups, for example, $C_{1-3}$ alkyl groups. Preferably, $R_1$, $R_2$, and $R_3$ are all hydrogen.

In a preferred embodiment, the di-functional aromatic epoxy compound is a compound of formula II:

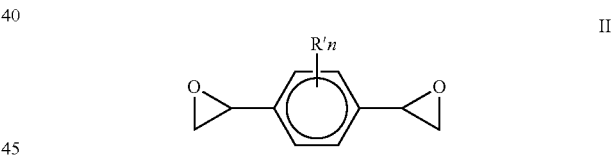

where n=1-4, and each $R'_n$ is independently as defined for $R_{1-3}$, above. Preferably, each $R'_n$ is independently hydrogen, methyl, ethyl, n-propyl, or isopropyl. Some preferred compounds include 1,4-divinylbenzene dioxide; 2-methyl-1,4-divinylbenzene dioxide; 2,3-dimethyl-1,4-divinylbenzene dioxide; 2,5-dimethyl-1,4-divinylbenzene dioxide; 2,6-dimethyl-1,4-divinylbenzene dioxide; 2-ethyl-1,4-divinylbenzene dioxide; 2,3-diethyl-1,4-divinylbenzene dioxide; 2,5-diethyl1,4-divinylbenzene dioxide; and 2-methyl-5-ethyl-1,4-divinylbenzene dioxide; and combinations of two or more thereof. In a yet more preferred embodiment, each $R'_n$ is H, such that the di-functional aromatic epoxy compound is divinylbenzene dioxide (DVBDO), preferably comprising 1,4-divinylbenzene dioxide (also known as 2,2'-(phenylen) bis[oxirane]).

The di-functional aromatic epoxy compound can be synthesized by one of ordinary skill in the art of synthetic organic chemistry. U.S. Pat. No. 8,669,384 (incorporated herein by reference in its entirety) discloses processes including (a) reacting at least one divinylarene with hypochlorous acid to form a chlorohydrin; and (b) treating the chlorohydrin formed in step (a) with at least one base, under conditions to form a divinylarene dioxide product. M. Worzakowska, J. Appl. Poly. Sci. (2007) vol. 103, 462-469 (incorporated herein by reference in its entirety), discloses epoxidizing divinyl benzene using acetonitrile-hydrogen peroxide with magnesium oxide catalyst and greater than a 4-fold molar excess of hydrogen peroxide to olefin. U.S. Pat. No. 2,977,374 (incorporated herein by reference in its entirety) discloses epoxidizing divinyl benzene using peracetic acid in ethyl acetate.

The person of ordinary skill in the art will appreciate that during the manufacture of the di-functional aromatic compound, a mixture of configurations may be obtained. To illustrate, the manufacture of a di-functional phenylene compound will generally yield a mixture of ortho, meta, and para configurations. For example, the method of U.S. Pat. No. 8,669,384 is stated to provide mainly the meta (for example, 1,3-DVBDO) and para (for example, 1,4-DVBDO) isomers, with the ortho isomer (1,2-DVBDO) being rare. Such mixtures of isomers are included in the present invention. As used in the present disclosure, naming a compound by its isomer (for example, 2,4-divinylbenzene dioxide) is open to the compound comprising a minor amount (less than 50%, preferably less than 30%, 20%, or 15%) of other isomers.

Resin compositions of the present invention can comprise any amount of di-functional aromatic epoxy compound that imparts the desired viscosity properties, and preferably imparts the desired mechanical properties. In general, resin compositions of the present invention comprise more than 0 wt %, more preferably more than 1 wt % or 5 wt %, di-functional aromatic epoxy compound based on the weight of the resin composition. Resin compositions of the present invention generally comprise less than 30 wt %, more preferably less than 20 wt % or 15 wt % based on the weight of the resin composition. Some preferred amounts include 5 wt %, 10 wt %, 20 wt %, and 30 wt %.

Compositions of the present invention preferably comprise a toughener, preferably comprising a polyphenolic blocked polyurethane. Preferred polyphenolic blocked PU tougheners can be made according to U.S. Pat. No. 8,278,398, the disclosure of which is incorporated herein by reference in its entirety. The polyphenolic blocked PU preferably helps to increase the impact peel strength of the cured adhesive.

The polyphenolic capped PU is preferably a liquid or low-melting elastomeric material that contains capped or blocked isocyanate groups. The elastomeric portion of the elastomeric toughener includes one or more soft segments such as a polyether, a polybutadiene, or a polyester. Particularly preferred soft segments include poly(ethylene oxide) blocks, poly(propylene oxide) blocks, poly(ethylene oxide-co-propylene oxide) blocks, poly(butylene oxide) blocks, poly(tetrahydrofuran) blocks, poly(caprolactone) blocks and the like. These soft segments typically have a molecular weight of from 1000 to 10,000 daltons each, preferably from about 1500 to 5000 daltons. An especially preferred type of soft segment is a poly(tetrahydrofuran) block having a weight of from 2200 to 4500 daltons.

The polyphenolic capped PU contains at least one blocked or capped isocyanate group per molecule. It preferably contains an average of at least 2 such groups per molecule, but typically no more than 6 and preferably no more than about 4 blocked or capped isocyanate groups per molecule. Examples of capping or blocking groups are phenols or phenolamines, primary aliphatic, cycloaliphatic, heteroaromatic and araliphatic amines; secondary aliphatic, cycloaliphatic, aromatic, heteroaromatic and araliphatic amines, monothiols, alkylamides and hydroxyl functional epoxides, and benzyl alcohols. The capping or blocking group may contain functional groups such as phenol, aromatic amino, —OCN, epoxide, or it may comprise further polyurethane elastomers bound to it, but the capping or blocking group may instead be devoid of such groups. Preferred capping groups include a secondary aliphatic amine, a hydroxyalkylepoxide, or a phenol, aminophenol, polyphenol, allylphenol, or polyallylpolyphenol such as o,o-diallyl bisphenol A.

A convenient way to produce the polyphenolic capped PU is by forming an isocyanate-terminated prepolymer, and then reacting the remaining isocyanate groups with the capping or blocking agent. The isocyanate-terminated prepolymer is prepared by reacting a polyether polyol or polyester polyol, which corresponds to the structure of the soft segment of the reactive toughener, with an excess of a polyisocyanate. The polyisocyanate preferably contains aliphatic isocyanate groups. Preferred polyisocyanates are hexamethylene diisocyanate and isophorone diisocyanate.

The polyphenolic capped PU should be soluble or dispersible in the remainder of the components of the resin component A. The polyphenolic capped PU preferably has a viscosity at 45° C. which is not greater than 1000 Pa·s and more preferably no more than about 800 Pa·s. Preferably, the weight average molecular weight of the toughener is about 8,000 or greater, and more preferably about 10,000 or greater. Preferably, the weight average molecular weight of the toughener is about 80,000 or less, and more preferably about 40,000 or less. Molecular weights as used herein are determined according to GPC analysis.

General methods for preparing these elastomeric tougheners are described, for example, in U.S. Pat. No. 5,278,257, WO 2005/118734, U.S. Published Patent Application No. 2005/0070634, U.S. Pat. No. 7,910,656, U.S. Pat. No. 8,404,707, EP 1 602 702A and EP-A-0 308 664, all of which are incorporated by reference in their entireties.

Any suitable amount of polyphenolic blocked PU can be used in resin compositions of the present invention. Preferably, a sufficient amount is used to beneficially affect the impact peel strength of the cured adhesive. In general, resin compositions of the present invention comprise at least 10 wt %, or 15 wt % polyphenolic blocked PU, based on the weight of the resin composition. In general, resin compositions of the present invention comprise up to 35 wt %, 30 wt %, or 25 wt % polyphenolic blocked PU, based on weight of the resin composition. A preferred amount is 27 wt %.

The core-shell rubber component is a particulate material having a rubbery core. Any core-shell rubber material may be used in the present invention. Some preferred core-shell rubber compositions are disclosed in U.S. Pat. Nos. 7,642,316 and 7,625,977, the disclosures of which are incorporated herein in their entireties.

The rubbery core preferably has a Tg of less than −25° C., more preferably less than −50° C., and even more preferably less than −70° C. The Tg of the rubbery core may be well below −100° C. The core-shell rubber also has at least one shell portion that preferably has a Tg of at least 50° C. By "core," it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked. The rubbery core may constitute from 50 to 95%, especially from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexyl-acrylate. The core polymer may in addition contain up to 20% by weight of other copolymerized mono-unsaturated monomers such as styrene, vinyl acetate, vinyl chloride, methyl methacrylate, and the like. The core polymer is optionally crosslinked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl.

The shell polymer, which is optionally chemically grafted or crosslinked to the rubber core, is preferably polymerized from at least one lower alkyl methacrylate such as methyl methacrylate, ethyl methacrylate or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer which can react with an epoxy resin or an epoxy resin hardener. Glycidyl groups are suitable. These can be provided by monomers such as glycidyl methacrylate.

A particularly preferred type of core-shell rubber is of the type described in U.S. 2007/0027233 (EP 1 632 533 A1), the disclosure of which is incorporated herein by reference in its entirety. Core-shell rubber particles as described in the document include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in the document.

Preferred core-shell rubbers include those sold by Kaneka Corporation under the designation Kaneka Kane Ace, including the Kaneka Kane Ace 15 and 120 series of products, including Kaneka Kane Ace MX 153, Kaneka Kane Ace MX 156, Kaneka Kane Ace MX 257 and Kaneka Kane Ace MX 120 core-shell rubber dispersions, and mixtures thereof. The products contain the core-shell rubber particles pre-dispersed in an epoxy resin, at concentrations of approximately 33% or 25%.

Any amount of core-shell rubber dispersion may be used. The resin composition of the present invention preferably has a core-shell rubber content (based on amount of dispersion) of at least 1 wt %, more preferably at least 5 wt %, more preferably at least 10 wt % or 15 wt %. The resin composition of the present invention preferably has a total core-shell rubber content (based on amount of dispersion) up to 40 wt %, more preferably up to 35 wt % or 25 wt %. A preferred amount includes about 30 wt %.

As noted above, the resin composition of the present invention may include an epoxy resin. Epoxy resins useful in this invention include a wide variety of curable epoxy compounds and combinations thereof. Useful epoxy resins include liquids, solids, and mixtures thereof. In order to avoid increasing viscosity, liquid epoxy resins are preferred. By "liquid epoxy resin" is meant an epoxy resin that is liquid at room temperature, for example, liquid at 25° C., 15° C. or 5° C.

Typically, the epoxy compounds are epoxy resins which are also referred to as polyepoxides. Polyepoxides useful herein can be monomeric (for example, the diglycidyl ether of bisphenol A, diglycidyl ether of bisphenol F, digylcidyl ether of tetrabromobisphenol A, novolac-based epoxy resins, and tris-epoxy resins), higher molecular weight resins (for example, the diglycidyl ether of bisphenol A advanced with bisphenol A) or polymerized unsaturated monoepoxides (for example, glycidyl acrylates, glycidyl methacrylate, allyl glycidyl ether, etc.) to homopolymers or copolymers. Most desirably, epoxy compounds contain, on the average, at least one pendant or terminal 1,2-epoxy group (that is, vicinal epoxy group) per molecule. Solid epoxy resins that may be used in the present invention can preferably comprise or preferably be mainly based upon Bisphenol A. For example, a preferred epoxy resin is diglycidyl ether of bisphenol A. Some preferred liquid epoxy resins include DER 330, DER 331 and DER 332, commercially available from The Dow Chemical Company. One preferable epoxy resin has general formula:

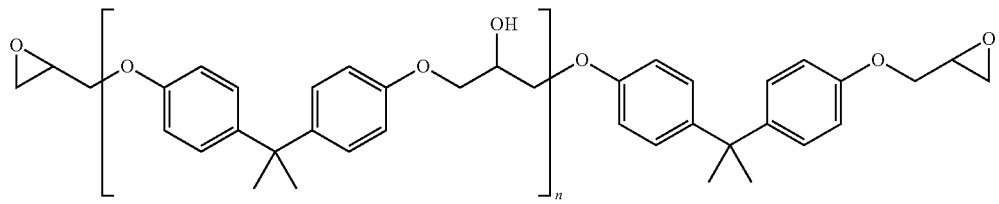

where n is generally in the range of 0 to about 25. Some basic liquid resins, for example, D.E.R. 331, can have epoxy equivalent weights in the range of about 180 to 195 g/mol. Others, such as D.E.R. 332, can have epoxy equivalent weights in the range of about 170 to 175 g/mol. D.E.R. 330 can have epoxy equivalent weights in the range of about 176 to 185 g/mol.

Combinations of epoxy resins may be used to adjust properties of the epoxy adhesive.

In compositions and methods of the present invention, the epoxy adhesive, when present, may comprise any amount of epoxy resin. When present, the optional epoxy resin, preferably liquid epoxy resin, comprises more than 0 wt % or 1 wt %, more preferably more than 5 wt % or 10 wt %, of the resin composition. Preferably, the epoxy resin comprises less than 50 wt %, more preferably less than 40 wt % or 30 wt %, of the epoxy adhesive. Some preferred amounts include 0 wt %, 10 wt %, 20 wt %, and 25 wt %.

The inventive resin composition may optionally include one or more non-aromatic reactive diluents, preferably comprising an alkyl glycidyl ether. A preferred alkyl glycidyl ether comprises an alkyl diglycidyl ether. Preferred alkyl groups include $C_{3-10}$ alkyl groups comprising cyclic and/or linear portions, preferably linear $C_{3-10}$ alkyl groups, more preferably linear $C_{3-10}$ alkyl groups that are glycidyl-terminated. Some preferred alkyl glycidyl ethers include 1,6-hexanediol-dglycidyl ether (commercially available as Polypox R18 from The Dow Chemical Company) and 1,4-butanediol-dglycidyl ether (commercially available as Polypox R3 from The Dow Chemical Company).

Alkyl ester dioxides (for example, alkyl glycidyl esters) may also be used. Preferred esters include $C_{3-10}$ esters comprising cyclic and/or linear portions, cyclo-aliphatic. One such compound is 3,4-epoxycyclo-hexylmethyl-3,4-epoxycyclohexanecarboxylate (CAS number 2386-87-0, available as Syna Epoxy 21, from Synasia).

The optional alkyl glycidyl ethers and esters may be used, for example, to modify the viscosity characteristics of the composition. However, excess alkyl glycidyl ether and/or ester can negatively impact mechanical properties of the cured adhesive, such as Tg, modulus, or other properties. Therefore, when used, the amount is preferably kept low enough that the Tg (or other property) of the cured adhesive is still acceptable. The amount may be kept below 25 wt %, more preferably below 20 wt %, 15 wt %, 10 wt %, or 5 wt %. When used, suitable amounts may be at least 1 wt %, 3 wt % or 5 wt %.

The viscosity behavior of the inventive resin composition is preferably such that the resin composition can be applied and used below room temperature, for example, below 25° or 23° C. The inventive compositions preferably have suitable viscosity at 20° C., at 15° C., 10° C. and/or at 5° C. A suitable viscosity below room temperature is a viscosity that is not so high as to make processing (for example, mixing with a hardener composition) inefficient, impractical, or difficult (for example, slow), at that temperature. Preferably, a suitable viscosity for the resin composition is 200 Pa·sec or less, 175 Pa·sec or less, 150 Pa·sec or less, 125 Pa·sec or less, or 100 Pa·sec or less. While there is no particularly preferred lower viscosity, a suitable viscosity for the resin composition will generally be 15 Pa·sec or higher, 25 Pa·sec or higher, 50 Pa·sec or higher. Each of these upper and lower viscosity values is applicable to each temperature listed above (25° C., 23° C., 20° C., 15° C., 10° C., 5° C.) as well as ranges formed from these temperatures.

When a hardener composition and an inventive resin composition are combined, it will be appreciated that the viscosity of the mixture can differ from the viscosity of the resin composition. Without limiting the present invention, it is generally the case that a hardener composition has lower viscosity than a resin composition, especially below room temperature. Therefore, it is generally the case that the mixture has lower viscosity than the resin composition. A combination of hardener and inventive resin composition can have any viscosity that permits thorough mixing of the components, and/or that permits efficient application to the surfaces to be bonded. In one preferred aspect, the combination of a hardener composition and an inventive resin composition preferably meets the viscosities listed in the previous paragraph.

In another preferred aspect, a suitable viscosity for the resin/hardener mixture is 100 Pa·sec or less, 90 Pa·sec or less, 80 Pa·sec or less, 70 Pa·sec or less, or 60 Pa·sec or less. While there is no particularly preferred lower viscosity, a suitable viscosity for the resin/hardener mixture will generally be 5 Pa·sec or higher, 10 Pa·sec or higher, 20 Pa·sec or higher. Each of these upper and lower viscosity values is applicable to each temperature listed above (25° C., 23° C., 20° C., 15° C., 10° C., 5° C.) as well as ranges formed from these temperatures.

The hardener composition is not particularly limited, and can be any hardener composition that is capable of hardening the inventive resin composition. As is known to those of ordinary skill in the art, hardener compositions generally comprise a hardener (which can be latent or non-latent), and may contain one or more other ingredients, such as curing accelerator, filler, thixotropic agent, reactive diluent, non-reactive diluent, adhesion promoter, surfactant, wetting agent, or pigment.

The hardener composition and the inventive resin composition may be combined in any proportion suitable for that particular combination. In general, suitable weight proportions of resin composition to hardener composition include 10:1, 4:1, 2:1 and 1:1.

In general, additives that decrease viscosity of the resin composition of a 2K adhesive, or that lower the viscosity of an uncured 2K or 1K adhesive, have an adverse impact on strength of the cured adhesive (for example, lap shear strength and/or impact peel strength), and/or on bulk properties of the cured adhesive (for example, Tg, E-modulus, tensile strength, and/or elongation at break). Resin compositions of the present invention surprisingly provide cured adhesives with improved mechanical properties, such as high lap shear strength, impact peel strength, Tg, E-modulus, tensile strength, and/or elongation at break.

Lap shear strength of a cured adhesive according to the present invention is preferably at least 16 MPa, more preferably at least 18 MPa or 20 MPa. While there is no particularly preferred upper value for lap shear strength, it will generally be less than or equal to 30 MPa. Any method may be used to measure lap shear strength. A preferred measurement is conducted according to DIN EN 1465: 25×10 mm; adhesive layer thickness 0.2 mm; 10 mm/min, using electro-galvanized zinc coated steel DCO5B+ZE75/75 0.75 mm substrate (referred to herein as ZE).

Impact peel strength of a cured adhesive according to the present invention is preferably at least 20 MPa, more preferably at least 22 MPa, 24 MPa, or 26 MPa. While there is no particularly preferred upper value for lap shear strength, it will generally be less than or equal to 40 MPa. Any method may be used to measure impact peel strength. A preferred measurement is conducted according to DIN EN ISO 11343: 20×60 mm; 2 m/s, using ZE substrate.

Mechanical strength properties generally decrease near and above the glass transition temperature (Tg). Cured adhesive compositions of the present invention preferably have high glass transition temperature, preferably at least 65° C., more preferably at least 70° C., or 75° C. While there is no particularly preferred upper Tg value, the Tg will generally be less than 100° C. or 90° C.

A high E-modulus is generally desired for epoxy adhesives used in automotive repair shops. The E-modulus of a cured adhesive according to the present invention is preferably at least 500 MPa, more preferably at least 600 MPa, 700 MPa, or 800 MPa. There is no particularly preferred upper E-modulus value. As a general matter, the E-modulus of a cured adhesive according to the present invention is less than or equal to 1000 MPa, or 900 MPa.

Cured adhesive compositions of the present invention preferably have high tensile strength. The tensile strength of a cured adhesive according to the present invention is preferably at least 15 MPa, more preferably at least 17 MPa or 20 MPa. There is no particularly preferred upper value for the tensile strength. As a general matter, the tensile strength of a cured adhesive according to the present invention is less than or equal to 30 MPa, or 25 MPa.

Cured adhesive compositions of the present invention preferably have elongation at break (elongation). The elongation of a cured adhesive according to the present invention is preferably at least 20% at breakage, more preferably at least 25% or 30%. There is no particularly preferred upper value for the elongation. As a general matter, the tensile strength of a cured adhesive according to the present invention is less than or equal to 60%, 50%, or 40%.

Bulk properties (for example, Tg, E-modulus, tensile strength, and/or elongation at break) can be measured by any method or methods. A preferred method for measurement of E-modulus, tensile strength and elongation at break is conducted according to DIN EN ISO 527-1 and -2. A preferred method utilizes dynamic mechanical analysis (DMA), testing between −40° to 200° C., or 0° to 120° C., with 3° C./min and a test frequency of 1 Hz. Testing can be conducted with a TA Instruments AR 2000ex, using a rectangular solid specimen of dimensions 50.0 mm×12.5 mm×2.00 mm.

In a 2K adhesive comprising a resin composition A and a hardener composition B, the two compositions are preferably associated with each other. Any method of associating resin composition A and hardener composition B is acceptable. For example, without limitation, the compositions may be in separate containers but packaged together in a single package; the compositions may be labeled (one composition or both) indicating that they may or should be used to prepare an adhesive composition; there may be instructions instructing or guiding their use together; the compositions may be connected to an applicator device (for example, an automatic application gun); or the compositions may be combined into a single composition.

EXAMPLES

Lap shear strength is tested according to DIN EN 1465: 25×10 mm; adhesive layer thickness 0.2 mm; 10 mm/min, on ZE substrate.

Impact peel strength is tested according to DIN EN ISO 11343: 20×60 mm; 2 m/s on ZE substrate.

Viscosity is tested using a Bohlin rheometer, cone plate, 20 mm diameter and 4° angle, shear rate ramp up 0.1 to 20 $s^{-1}$ and back. Viscosity factor is calculated using the Casson model and given by the real viscosity value at a shear rate of 10 $s^{-1}$.

DMA is performed between −20 to 150° C. with 3° C./min and a test frequency of 1 Hz A list of raw materials used in the Examples is provided in Table 1.

TABLE 1

| Raw material | Chemical Description | Supplier |
| --- | --- | --- |
| Epoxy part | | |
| DVBDO | 1,4-divinylbenzene dioxide | Example 2 or per U.S. Pat. No. 8,669,384 |
| Syna Epoxy 21 | 3,4-epoxycyclohexylmethyl-3,4-epoxycyclohexanecarboxylate CAS number: 2386-87-0 | Synasia |
| D.E.R. 331 | Liquid D.E.R. Bis A based | Dow |
| Silquest A 187 | Epoxy-silane | Momentive |
| Cardolite NC 700 | Cashew nut liquid oil | Cardolite |
| Irgalite Green | colorant | Prochem |
| Polypox R18 | reactive diluents: 1,6-hexanediol-diglycidylether Toughener and flexibilizers | Dow |
| Toughener A | Bis A blocked-PU | Example 1 |
| Kaneka 156 | CSR-LER DGEBA dispersion | Kaneka |
| Hardener part | | |
| Lupasol P | polyethyleneimine | BASF |
| Jeffamine D400 | Polymeric polyetheramine | Air Products |
| Jeffamine T403 | Polymeric polyetheramine | Air Products |
| Jeffamine D2000 | Polymeric polyetheramine | Air Products |
| 4,7,10-Trioxa-1,13-tridecanediamine | | Sigma Aldrich |
| HYCAR ATBN X16 | Amine terminated polybutadiene | Schill&Seilacher |
| Ancamine K54 | 2,4,6-tris(dimetyhlaminomethyl)phenol | Air Products |
| Wetting agent FC4430 | Fluoro surfactant | 3M |
| Colorant $TiO_2$ | Rutil: titanium dioxide | various |
| Fillers | | |
| Mistrofil HS 40 | Chlorite | Imerys |
| Talk 1N | talc | Imerys |
| Spheriglass 2024 | Glass beads | Potters |
| Amicure CG 1200G | Dicyandiamide | Air Products |
| Aerosil R202 | Hydrophobic Fumed silica | Evonik |
| Aerosil 380 | Fumed silica | Evonik |

Example 1

A polyphenolic blocked PU toughener is prepared according to U.S. Pat. No. 7,557,169 as follows. 66.6 g of polytetrahydrofuran having a molecular weight of approximately 2000 (Mw) is preheated at 90° C. The resulting liquid is then poured into a vessel and 20.7 g of bisphenol A and 0.3 g of trimethylolpropane are added. The resulting suspension is heated up to 140° C., and stirred until all bisphenol A is dissolved. After the mixture is cooled down to 60° C., 12.3 g hexamethylene diisocyanate is added. The mixture is stirred to homogeneity. Then 0.02 g dibutyltin-dilaurate is added. An exothermic reaction is started, followed by an increase of temperature between 20 and 30° C. up to 90° C. The solution is cooled and stirred for 1 hour to finish the reaction. This product is referred to herein as Toughener A.

Example 2

Divinylbenzene (9.95 g, 0.077 mol), acetone (290 g), and deionized water (73.2 g) are charged to 1-Liter 5-neck flask, jacketed, with baffles, equipped with a mechanical stirrer, a hypochlorous acid (HOCl) feed inlet, and a glycol cooled condenser.

While vigorously stirring the resulting mixture, a 4.16% HOCl solution in water (174.06 g, 0.138 mol HOCl, pH 3.7) is added to the mixture at a feed rate of 2.9 g/minute. The HOCl solution is added over a period of 60 minutes while allowing the temperature to increase to 30° C. The mixture is cooled to 22° C., and then the resulting clear homogeneous solution is extracted with methylene chloride (290 g) followed by settling then separation of the resulting phases. Solvent is removed in vacuo at 70° C. and 20 mm Hg pressure yielding 15.0 g of crude product containing 51.9% divinylbenzene dichlorohydrin (DVBDCH) (sum of meta and para isomers).

The crude DVBDCH is dissolved in toluene-isopropanol solution (28.8 g toluene, 7.2 g IPA) and transferred to a jacketed reactor. The mixture is warmed to 55° C. with vigorous stirring whereupon a 20% NaOH solution (20.5 g) is added to the mixture over 30 minutes. The mixture is stirred an additional 60 minutes at 60° C., and then cooled to 20° C. The resulting layers formed in the reactor are allowed to settle, and then the resulting lower brine layer is removed. The remaining organic layer is washed once with 2% NaHCO3 solution (25 g), and then two times with deionized water (25 g per wash). The organic layer following the washes (32.5 g) is analyzed by GC and contains 14.5 wt % of DVBDO. Solvent and by-products are removed, and the product is purified.

Example 3

Eight epoxy resin compositions are prepared, of which four are inventive (A2-A5), and four are comparative (A1, A6-A8). The epoxy resin, core-shell rubber, DVBDO or Syna Epoxy 21, toughener, colorant, silane, Polypox R18 and Cardolite are mixed on a laboratory planetary mixer for about 30 minutes under vacuum. In this time the temperature of the mixture is brought to about 45° C. using the heat jacket of the mixer. The remaining ingredients are then added and the mixture stirred at about 45° C. for about 5 minutes. A scrape-down is performed, and the components are mixed further for 30 minutes under vacuum. In this time the temperature of the mixture is brought to about 20° C. using the heat jacket of the mixer as a cooler.

The viscosities of the eight compositions are measured at various temperatures. The ingredients of the compositions (wt %), and the viscosity measurements, are shown in Table 2.

TABLE 2

| | Part A (epoxy) | | | | | | | |
|---|---|---|---|---|---|---|---|---|
| | A1 comp. | A2 inv. | A3 inv. | A4 inv. | A5 inv. | A6 comp. | A7 comp. | A8 comp. |
| DVBDO | 0 | 30 | 20 | 10 | 5 | 0 | 0 | 0 |
| Syna Epoxy 21 | 0 | 0 | 0 | 0 | 0 | 10 | 5 | 0 |
| D.E.R. 331 | 30 | 0 | 10 | 20 | 25 | 20 | 25 | 10 |
| Silane A 187 | 3 | 3 | 3 | 3 | 3 | 3 | 3 | 3 |
| Toughener A | 27 | 27 | 27 | 27 | 27 | 27 | 27 | 27 |
| Kaneka MX 156 | 29.5 | 29.5 | 29.5 | 29.5 | 29.5 | 29.5 | 29.5 | 29.5 |
| Polypox R18 | 5 | 5 | 5 | 5 | 5 | 5 | 5 | 25 |
| Cardolite NC 700 | 0.5 | 0.5 | 0.5 | 0.5 | 0.5 | 0.5 | 0.5 | 0.5 |
| colorant | 0.4 | 0.4 | 0.4 | 0.4 | 0.4 | 0.4 | 0.4 | 0.4 |
| Filler: | | | | | | | | |
| Mistrofil HS 40 | 3 | 3 | 3 | 3 | 3 | 3 | 3 | 3 |
| Talc 1N | 0.8 | 0.8 | 0.8 | 0.8 | 0.8 | 0.8 | 0.8 | 0.8 |
| Aerosil 380 | | | | | | | | |
| Glass beads Spheriglass 2024 | 0.8 | 0.8 | 0.8 | 0.8 | 0.8 | 0.8 | 0.8 | 0.8 |
| Rheology test results | | | | | | | | |
| Casson, Bohlin [Pa · s], 23° C. | 129 | 18 | 28 | 50 | 83 | 102 | 111 | 27 |
| Viscosity at 10 s−1 shear rate tested at 23° C. | 170 | 28 | 38 | 58 | 92 | 125 | 130 | 40 |
| Casson, Bohlin [Pa · s], 15° C. | 270 | 63 | 78 | 144 | 190 | 330 | 285 | 44 |
| Viscosity at 10 s−1 shear rate tested at 15° C. | 340 | 80 | 102 | 186 | 224 | 445 | 389 | 55 |
| Casson, Bohlin [Pa · s], 10° C. | 360 | 96 | 129 | 250 | 300 | 351 | 365 | 102 |
| Viscosity at 10 s−1 shear rate tested at 10° C. | 482 | 133 | 191 | 270 | 405 | 492 | 510 | 142 |

A1 is a comparative formulation that comprises no di-functional aromatic epoxy, but comprises an alkyl glycidyl ether (Polypox R18). A2 to A5 are inventive formulations comprising di-functional aromatic epoxy compound. A6 and A7 are comparative formulations comprising the aliphatic low molecular weight epoxy resin Syna Epoxy 21 at two different ratios. A8 is a comparative formulation using a higher amount of Polypox R18.

The viscosity at 23° C. of the inventive formulations is significantly lower compared to the reference formulations. The greater the amount of di-functional aromatic epoxy, the lower the viscosity. The di-functional aromatic epoxy (DVBDO) generates lower viscosity, especially at lower temperatures, compared to Syna epoxy 21.

Example 4

A hardener composition B1 is prepared comprising the materials and amounts (wt %) shown in Table 3.

TABLE 3-continued

| Material | wt % |
| --- | --- |
| Colorant TiO2 | 0.7 |
| DICY: Amicure 1200G | 4 |
| Talc 1N | 4 |
| Aerosil 380 | 8 |

Hardener composition B1 is prepared as follows. Lupasol P, Jeffamine D400, Jeffamine T403, Jeffamine D2000, 4,7,10-Trioxa-1,13-tridecanediamine, Hycar ATBN ×16, Ancamine K54 and the Wetting agent FC4430 are mixed on a laboratory planetary mixer for about 30 minutes under vacuum. The remaining ingredients are then added and the mixture stirred for about 5 minutes. A scrape-down is performed, and the components are mixed further for 30 minutes under vacuum.

Adhesives are prepared by combining resin compositions A1 to A8 (prepared as in Example 3) with hardener composition B, in a 2:1 weight ratio of A:B. The viscosities of the mixtures are measured prior to curing. The mixtures are applied to ZE substrates. After curing for 7 days at 23° C., lap shear strength, impact peel strength, Tg, E-modulus, tensile strength, and elongation are measured. Results are shown in Table 4.

TABLE 4

|  | A1/B1 comp. | A2/B1 inv. | A3/B1 inv. | A4/B1 inv. | A5/B1 inv. | A6/B1 comp. | A7/B1 comp. | A8/B1 ref. |
| --- | --- | --- | --- | --- | --- | --- | --- | --- |
| Lap shear strength [MPa] | 21 | 19 | 20 | 21 | 20 | 19 | 19 | 18 |
| Impact peel strength [N/mm] | 30 | 25 | 28 | 30 | 32 | 38 | 39 | 36 |
| Tg [° C.], DMA 1 Hz | 76 | 78 | 75 | 74 | 72 | 62 | 66 | 58 |
| E-modulus [MPa] | 1050 | 680 | 850 | 850 |  |  |  |  |
| Tensile strength [MPa] | 20 | 22 | 21 | 21 |  |  |  |  |
| Elongation at break [%] | 22 | 27 | 38 | 26 |  |  |  |  |
| Casson, Bohlin [Pa · s], 23° C. | 42 | 9 | 11 | 27 | 30 | 34 | 44 | 15 |
| Viscosity at 10 s−1 shear rate tested at 23° C. | 81 | 26 | 31 | 55 | 55 | 60 | 81 | 31 |
| Casson, Bohlin [Pa · s], 15° C. | 120 | 24 | 34 | 63 | 75 | 77 | 110 | 27 |
| Viscosity at 10 s−1 shear rate tested at 15° C. | 180 | 55 | 82 | 111 | 115 | 114 | 169 | 51 |
| Casson, Bohlin [Pa · s], 10° C. | 183 | 38 | 68 | 128 | 145 | 183 | 179 | 56 |
| Viscosity at 10 s−1 shear rate tested at 10° C. | 220 | 72 | 112 | 191 | 205 | 225 | 221 | 81 |

TABLE 3

| Material | wt % |
| --- | --- |
| Lupasol P | 4 |
| Jeffamine D400 | 14 |
| Jeffamine T403 | 28 |
| Jeffamine D2000 | 5 |
| 4,7,10-Trioxa-1,13-tridecanediamine | 9 |
| HYCAR ATBN X16 | 11 |
| Ancamine K54 | 12 |
| Wetting agent FC4430 | 0.3 |

Example 5

Application trials at different temperatures and pressures are performed to judge the application performance especially at lower temperatures. The entire adhesive composition, resin composition A and hardener composition B, are applied out of a double cartridge using an automatic application gun. Table 5 shows the application rates achieved (g/min) for each adhesive combination at the noted pressure and temperature.

TABLE 5

| [g/min] | A1/B1 comp. | A2/B1 inv. | A3/B1 inv. | A4/B1 inv. | A5/B1 inv. | A6/B1 comp. | A7/B1 comp. | A8/B1 comp. |
|---|---|---|---|---|---|---|---|---|
| 3 bar/ 23° C. | 16 | 55 | 38 | 25 | 18 | 17 | 15 | 68 |
| 6 bar/ 23° C. | 45 | 164 | 101 | 66 | 53 | 49 | 49 | 108 |
| 6 bar/ 15° C. | 27 | 74 | 59 | 39 | 29 | 28 | 27 | 66 |
| 6 bar/ 10° C. | Not possible | 30 | 15 | 5 | Not possible | Not possible | Not possible | 23 |

The extrusion rates for compositions comprising DVBDO and the aliphatic diluent Polypox R3 are on an acceptable level for cold application. The extrusion rate for Syna Epoxy 21 at lower usage levels in the formulation is not beneficial for good cold temperature application, only at higher levels, preferably >10 wt %, good cold cure temperature applications are feasible.

The invention claimed is:

1. A resin composition for a two-part adhesive comprising
a) an epoxy compound having the formula

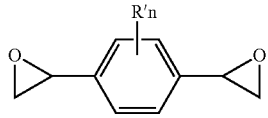

wherein each R' is independently hydrogen, methyl, ethyl, n-propyl or isopropyl;

b) a polyurethane comprising an elastomeric portion including one or more soft segments selected from a polyether, a polybutadiene or polyester soft segment, the soft segment or segments each having a molecular weight of 1000 to 10,000 daltons, the polyurethane having an average of 2 to 4 isocyanate groups capped with a polyphenol;
c) a core shell rubber epoxy dispersion comprising core shell rubber particles having a rubbery core with a $T_g$ of less than −25° C. and a shell polymer polymerized from at least one lower alkyl methacrylate provided that up to 40% of the weight of the shell polymer can be formed from styrene, vinyl acetate, vinyl chloride, methyl acrylate, ethyl acrylate and butyl acrylate; wherein the core shell rubber particles are dispersed in an epoxy resin and
d) an alkyl diglycidyl ether comprising a linear $C_{3-10}$ linear alkyl group that is glycidyl terminated.

2. The resin composition of claim 1, wherein the alkyl diglycidyl ether comprises 1,6-hexanediol diglycidyl ether.

* * * * *